United States Patent
Pekonen et al.

(10) Patent No.: US 8,213,383 B2
(45) Date of Patent: Jul. 3, 2012

(54) METHOD AND SYSTEM TO GUARANTEE SERVICE RECEPTION WITHIN BROADCAST SYSTEM

(75) Inventors: Harri J. Pekonen, Raisio (FI); Heidi Himmanen, Turku (FI); Jani Väre, Kaarina (FI); Jussi Vesma, Turku (FI); Pekka Talmola, Turku (FI)

(73) Assignee: Nokia Corporation, Espoo (FI)

( * ) Notice: Subject to any disclaimer, the term of this patent is extended or adjusted under 35 U.S.C. 154(b) by 956 days.

(21) Appl. No.: 12/204,750

(22) Filed: Sep. 4, 2008

(65) Prior Publication Data

US 2009/0097446 A1  Apr. 16, 2009

Related U.S. Application Data

(60) Provisional application No. 60/970,671, filed on Sep. 7, 2007.

(51) Int. Cl.
H04W 4/00 (2009.01)
H04J 3/06 (2006.01)
H04B 1/40 (2006.01)
H01Q 11/12 (2006.01)

(52) U.S. Cl. ........... 370/331; 370/350; 455/77; 455/120
(58) Field of Classification Search ........................ None
See application file for complete search history.

(56) References Cited

U.S. PATENT DOCUMENTS

2004/0264413 A1* 12/2004 Kaidar et al. ................. 370/328
2005/0157674 A1* 7/2005 Wentink ........................ 370/328

FOREIGN PATENT DOCUMENTS

| EP | 0 773 224 | 1/2001 |
| EP | 1 073 224 | 1/2001 |
| GB | 2 345 598 | 7/2000 |
| JP | 01208042 | 8/1989 |
| JP | 09307963 | 11/1997 |
| JP | 2006246465 | 9/2006 |

OTHER PUBLICATIONS

International Search Report for PCT Application No. PCT/IB2008/053572 dated Jun. 26, 2009.
Office action for European Application No. 08 807 525.4 dated Jan. 31, 2011.
Notice of Reasons for Rejection in JP 2010-523620 dated Apr. 26, 2012, with English translation.

* cited by examiner

*Primary Examiner* — Steven H Nguyen
(74) *Attorney, Agent, or Firm* — Banner & Witcoff, Ltd.

(57) ABSTRACT

A system and method is provided for ensuring that time for tuning to another RF channel between two TF frames in TF slicing exists while reception with a single hopping-tuner is enabled, and reception for terminals can be guaranteed when transmitting and receiving common services. An additional time for tuning is introduced for TF-sliced services, where the time for tuning can be inserted either before of after the P1 & P2 symbols, and the symbols allocated for the tuning time can also be used for transmission of low-bit rate services. Alternatively, additional padding bits and a guard period can be added in the event that slots or slot fragments exceed a cyclic transfer border upon time shifting. Alternatively still, the tuning time is represented by a complete TF frame, where the complete TF frame carries services other than those in the first TF frame, so that a service is transmitted in every second TF frame and a receiver can perform tuning during the TF frames which do not carry the service.

15 Claims, 17 Drawing Sheets

METHOD AND SYSTEM TO GUARANTEE SERVICE RECEPTION WITHIN BROADCAST SYSTEM

FIELD OF THE INVENTION

The present invention relates generally to the transferring of data in a transmission system. More particularly, the present invention relates to the scheduling of services for multiplexes covering several Radio Frequency (RF) channels.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital broadband broadcast networks enable end users to receive digital content including video, audio, data, etc. Using a mobile terminal, a user may receive digital content over a wireless digital broadcast network.

The capacity of a wireless transmission channel, in a broadcasting system, for example, can be divided between different services by using time-division multiplexing (TDM). Each service reserves a slot in a TDM frame, which results in a fixed bit rate. FIG. 1 illustrates time-frequency (TF) slicing in which each TF frame 100 and 110 is divided into four portions, one for each RF channel (identified as RF1, RF2, RF3, and RF4). That is, the capacity of a fixed TDM frame can be dynamically divided between physical channels for data transmission. Physical channels are TDM channels that reserve the specified slot from the frame, with one physical channel being capable of carrying one or more logical channels. There must be a time shift between the slots of a certain physical channel in different RF channels. This makes it possible to use receivers with one tuner, because the receiver then has time to tune to the new frequency before receiving the next slot. The number of RF channels can be $N_{RF}=2, 3, 4, 5, 6$ or more in various embodiments. It should be noted that the RF channels used do not need to be adjacent to each other.

Using such time-frequency (TF) slicing, bit rate variations are averaged over all of the services being provided, thereby resulting in a decreased overall bit rate variation and a lower amount of wasted capacity. With TF slicing according to conventional systems and methods, several RF channels are used to increase the size of the TDM frame at issue and to multiplex services over all of the channels. The number of services being provided is increased proportionally relative to the number of RF channels, resulting in an increased statistical multiplexing gain. This arrangement also provides frequency diversity by extending the channel coding and interleaving over all of the available RF channels.

A problem arises when guaranteeing time for tuning to another RF channel between two TF frames in TF slicing is desired in conjunction with a requirement that reception with a single hopping-tuner should be enabled. The problem of slot allocation in the TF scheduler, while requiring a tuning time between TF frames, is discussed below with regard to a previously proposed scheduling concept for TF-slicing. All services slot sizes of $X_i/N_{RF}$ are allocated on each RF frequency in the TF frame. $X_i$ can refer to the amount of orthogonal frequency division multiplexing (OFDM) cells required to carry the data of service i in the current TF frame, and $N_{RF}$ can refer to the number of RF frequencies.

Slots can be shifted, where the shift is the time frequency frame length $(T_F)$ divided by the number $(N_{RF})$ of allocated RF channels, or:

$$\text{shift} = \frac{T_F}{N_{RF}}.$$

In other words, the slots are shifted in relation to each other and the upper limit for $X_i/N_{RF}$ is max_slot_length=shift–$T_{tuning}$. $T_F$ describes the length of the TF frame in OFDM symbols, and $T_{tuning}$ is the time it takes for the receiver to change to another RF channel. A slot can be divided on one RF as illustrated with respect to RF3 in TF frame 100 and RF4 in TF frame 110 in FIG. 1, where $N_{RF}=4$.

However, this type of scheduling is not sufficient to guarantee reception with one tuner in situations where no constraints are set for the service bit rates. For example, the scheduling may lead to slot allocations, where sufficient tuning time before or after reception of pilot symbol signaling does not exist. It should be noted in relation to FIG. 1 that pilot symbols P1 and P2 (P1 & P2), which precede every TF frame are described in U.S. patent application Ser. No. 11/686,636, entitled "DVB-H2 SERVICE DISCOVERY FREQUENCY DOMAIN CORRELATION to Auranen et al.

It should be noted that the conventional rules for slot allocation for one tuner reception can be summarized as follows: If the last slot of the current TF frame and the first slot of the next TF frame are on different RF channels, and there is not enough time for tuning before the P1 & P2 signaling, time for tuning shall be reserved after the P1 & P2 signaling. Furthermore, if a slot is divided on one RF in the current TF frame, a slot carrying the same service cannot be divided on another RF in the next TF frame. If the allocation is illegal, the scheduler would, for example, have to perform for some manner of switching of service slots. Because almost every service allocation in conventional TF frame sets some restrictions on allocations in the next TF frame, the slot allocation scheduling becomes a very complex process, where the transmitter needs to perform receiver tests for all services and groups of services or PLPs (Physical Layer Pipes).

Another problem arises in cases where the "common service part" (e.g., teletext) needs to be received in parallel with audio and video services. Conventionally, this cannot be guaranteed in an optimized manner.

In the context of Digital Video Broadcasting-Terrestrial systems (DVB-T), no solution for the above-described issues has been proposed, although the utilization of spare capacity for the purposes of low bit rate services has been considered in U.S. patent application Ser. No. 11/686,661, entitled "DVB-T2H2 Low Bit Rate service" to Henriksson et al. Other related systems and methods are described in U.S. patent application Ser. No. 11/686,628, entitled "Common rate matching slot for variable bit rate services" Vesma et al., and U.S. patent application Ser. No. 11/748,889, entitled "Using BitTorrent Protocol for Best-effort services in DVB-T2M" to Väre et al.

SUMMARY OF THE INVENTION

Various embodiments provide a system and method for ensuring that time for tuning to another RF channel between two TF frames in TF slicing exists while reception with a single hopping-tuner is enabled, and reception for terminals can be guaranteed when transmitting and receiving common services. An additional time for tuning is introduced for TF-sliced services, where the time for tuning can be inserted either before of after the P1 & P2 symbols, and the symbols allocated for the tuning time can also be used for transmission of low-bit rate services. Alternatively, additional padding bits and a guard period can be added in the event that slots or slot fragments exceed a cyclic transfer border upon time shifting. Alternatively still, the tuning time is represented by a complete TF frame, where the complete TF frame carries services other than those in the first TF frame, so that a service is transmitted in every second TF frame and a receiver can perform tuning during the TF frames which do not carry the service.

When tuning time is added before or after the P1 & P2 signaling symbols, sufficient time for tuning can generally always be provided when receiving TF sliced services. Additionally, simple scheduling can be effectuated and no restrictions for bit rate variations of the services are necessarily required. Furthermore, the transmission of non TF-sliced services on one or several RFs is enabled, as is the dynamic removal of padding for every TF frame. When a service is transmitted in every second/other TF frame, sufficient time for tuning is also generally ensured when receiving TF sliced services. Again, simple scheduling can be effectuated with such embodiments, while overhead is not incurred, and the robustness of P1 & P2 (if TF frame length is unchanged) can be increased.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Various embodiments provide a system and method for ensuring that time for tuning to another RF channel between two TF frames in TF slicing exists while reception with a single hopping-tuner is enabled. Additionally, various embodiments provide an optimized system and method for transmitting and receiving common services in a manner such that reception is guaranteed for the terminals. According to one embodiment, an additional time for tuning is introduced for TF-sliced services, where the time for tuning can be inserted either before of after the P1 & P2 symbols. The symbols allocated for the tuning time can also be used for transmission of low-bit rate services. According to another embodiment, additional padding bits and a guard period can be added in the event that slots or slot fragments exceed a cyclic transfer border upon time shifting. According to yet another embodiment, the tuning time is represented by a complete TF frame, where the complete TF frame carries services other than those in the first TF frame. In other words, a service is transmitted in every second TF frame and a receiver can perform tuning during the TF frames which do not carry the service.

Figure 1:
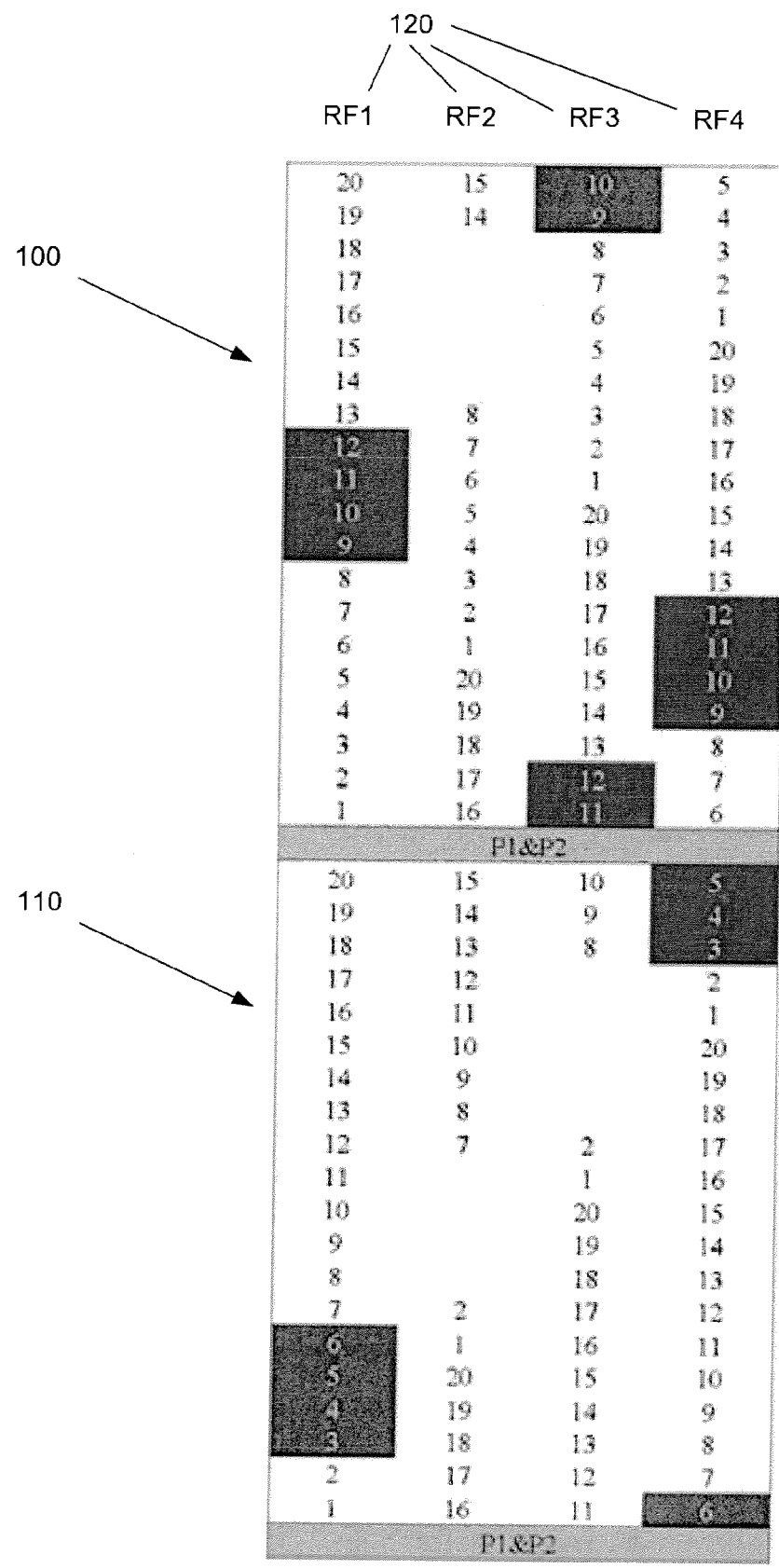
FIG. 1 is a representation of illegal slot allocation of a service between two TF frames.
Figure 2:
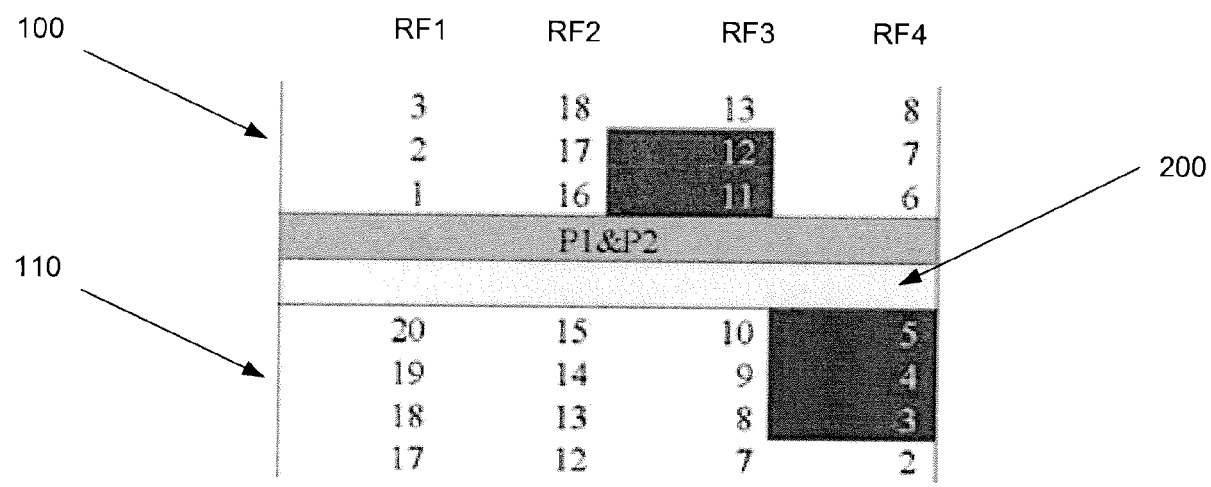
FIG. 2 is a representation of portions of TF frames illustrating the insertion of a tuning time for TF-sliced services before P1 and P2 signaling in accordance with various embodiments of the present invention.
Figure 3:
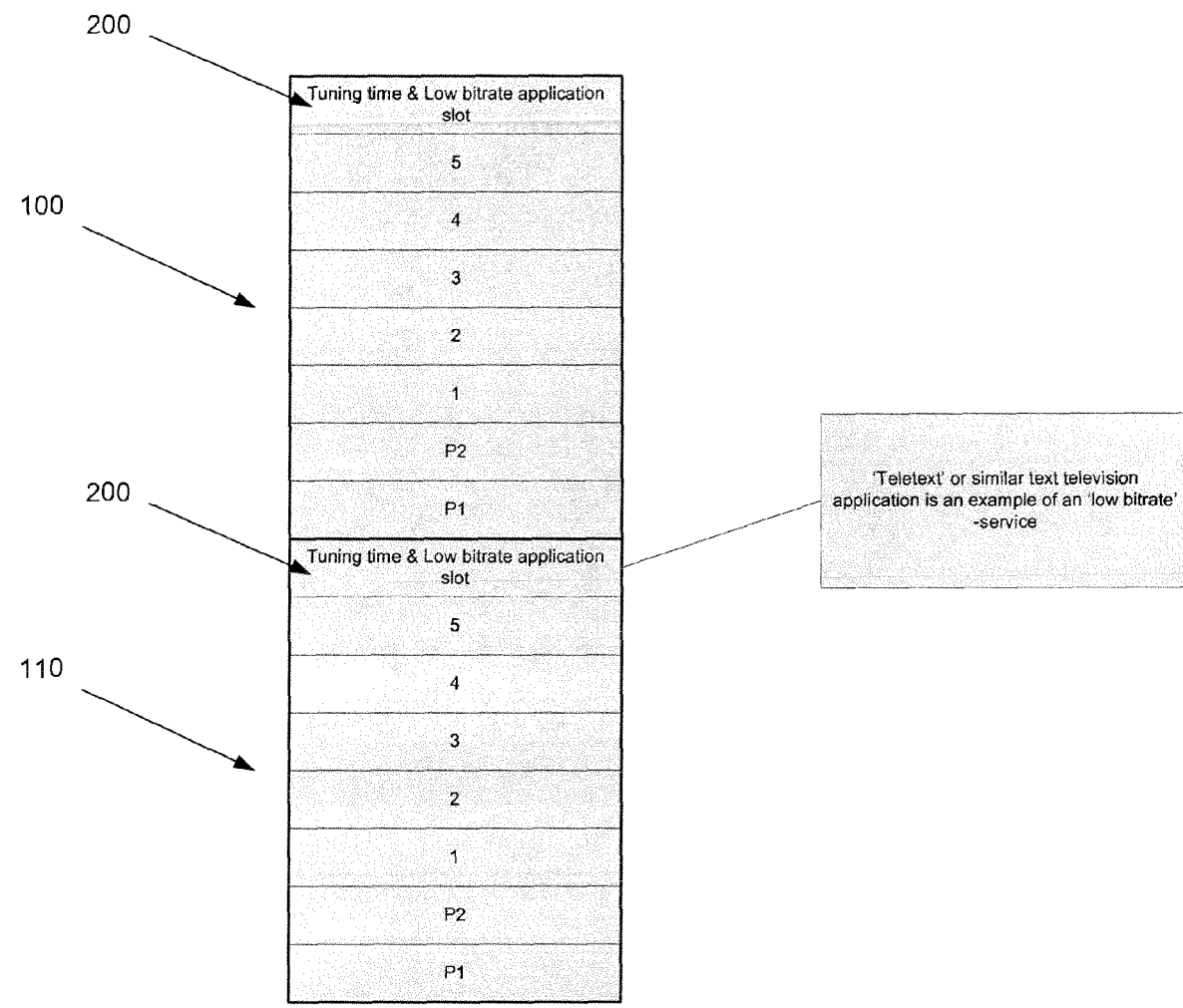
FIG. 3 is a representation of TF frames illustrating the principle of utilizing a tuning time and low bitrate application slot.

To enable simple slot allocation algorithms, such as that presented in FIG. 1, an additional time slot/period of the length of the tuning time can be added to every frequency before or after the signaling symbols P1 & P2. FIG. 2 and FIG. 3, in greater detail, illustrate this addition of a tuning time period 200 after the P1 & P2 signaling symbols and between TF frames 100 and 110. It should be noted that such additional slots are not redundant, but rather can be filled with a low bit rate service, e.g., a radio or an auxiliary (teletext-like) service. It should further be noted that the P1 & P2 string can be replaced with "pilot signaling," where more than two pilots may exist, each of which may have a duration of one symbol.

If the tuning time period 200 is inserted after the P1 & P2 symbols, the signaling symbols P1 & P2 can be used for synchronization and channel estimation by auxiliary services carried during the tuning time. If the tuning time period 200 is inserted before the P1 & P2 symbols provides an advantage in combination with removal of padding, described in the next section. In this case, the P1 & P2 signaling symbols can be used for synchronization and channel estimation by main services.

Overhead can occur if the services produce less data than can fill the capacity of the TF frame and certain symbols are filled with dummy data. For example symbols 20, illustrated in FIG. 1, can carry such dummy data. These dummy symbols can be forced to the end of the TF frame, where such symbols can be used, for example, as additional capacity allocated to the services carried during the tuning time as illustrated in the leftmost and center representations of TF frames 100 and 110 in FIG. 4. It should be noted that the tuning time period 200 (also referred to as a guard period), shown in FIG. 4 as being added before the P1 & P2 signaling symbols may be, in certain embodiments, constant and equal to $T_{tuning}$. Therefore, implementation of this one embodiment would keep the time between the signaling of the P1 & P2 symbols (TF frame length+guard period) constant, whereas the time shift would not necessarily be constant.

Figure 4:
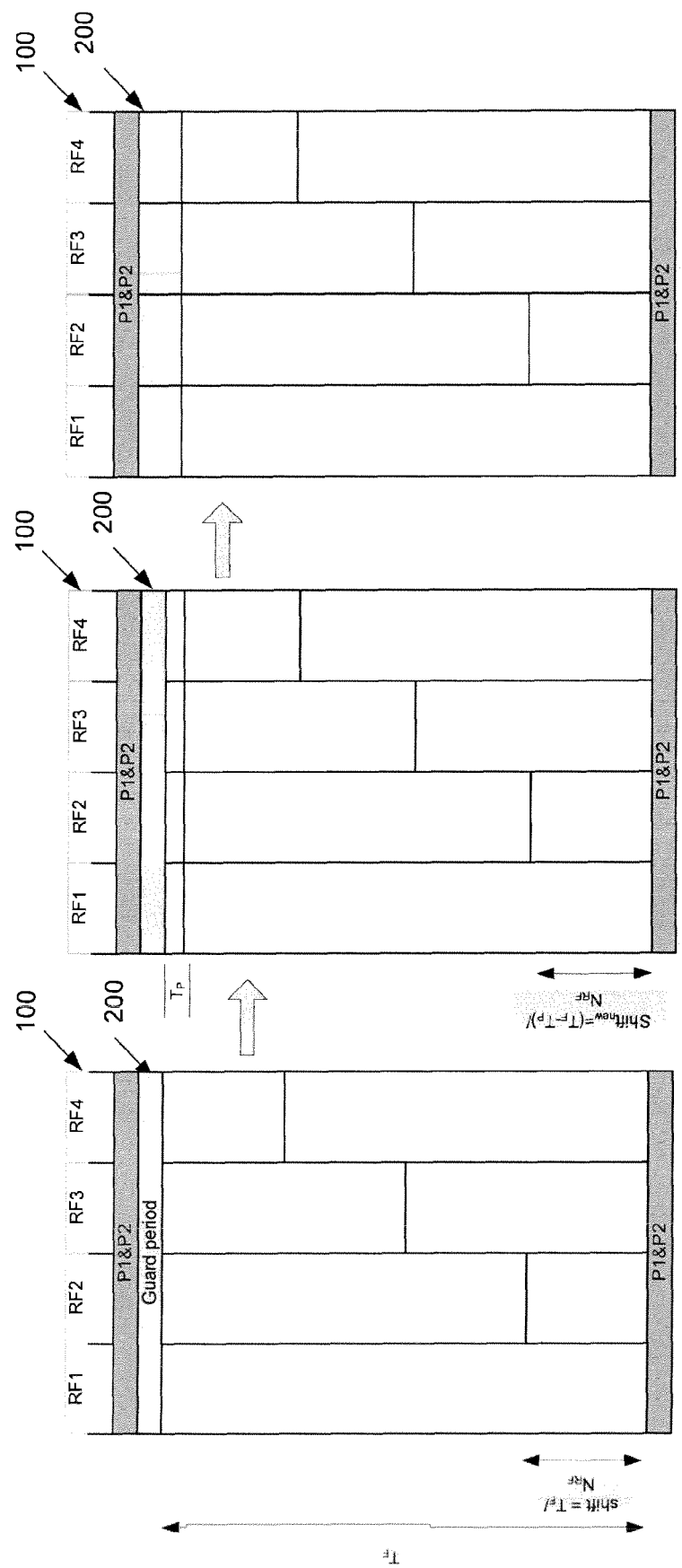
FIG. 4 illustrates padding removal in TF frames in accordance with various embodiments of the present invention.

Alternatively, the dummy signals can be utilized as part of the tuning time 200, so that the time between the last symbols of the sliced services and P1 & P2 equals the tuning time, as illustrated in the two rightmost representation of TF frames 100 and 100 in FIG. 4, where again, the tuning time period 200 is constant and equal to $T_{tuning}$. This causes a variation in both the time between the signaling of P1 & P2 (TF frame length+guard period) and the time shift. The new shift ($shift_{new}$), after moving dummy symbols to the end of the TF frame, can be calculated in an embodiment as $$shift_{new} = \frac{T_F - T_P}{N_{RF}},$$

where $T_P$ is the duration of the dummy symbols illustrated in FIG. 4.

Figure 5:
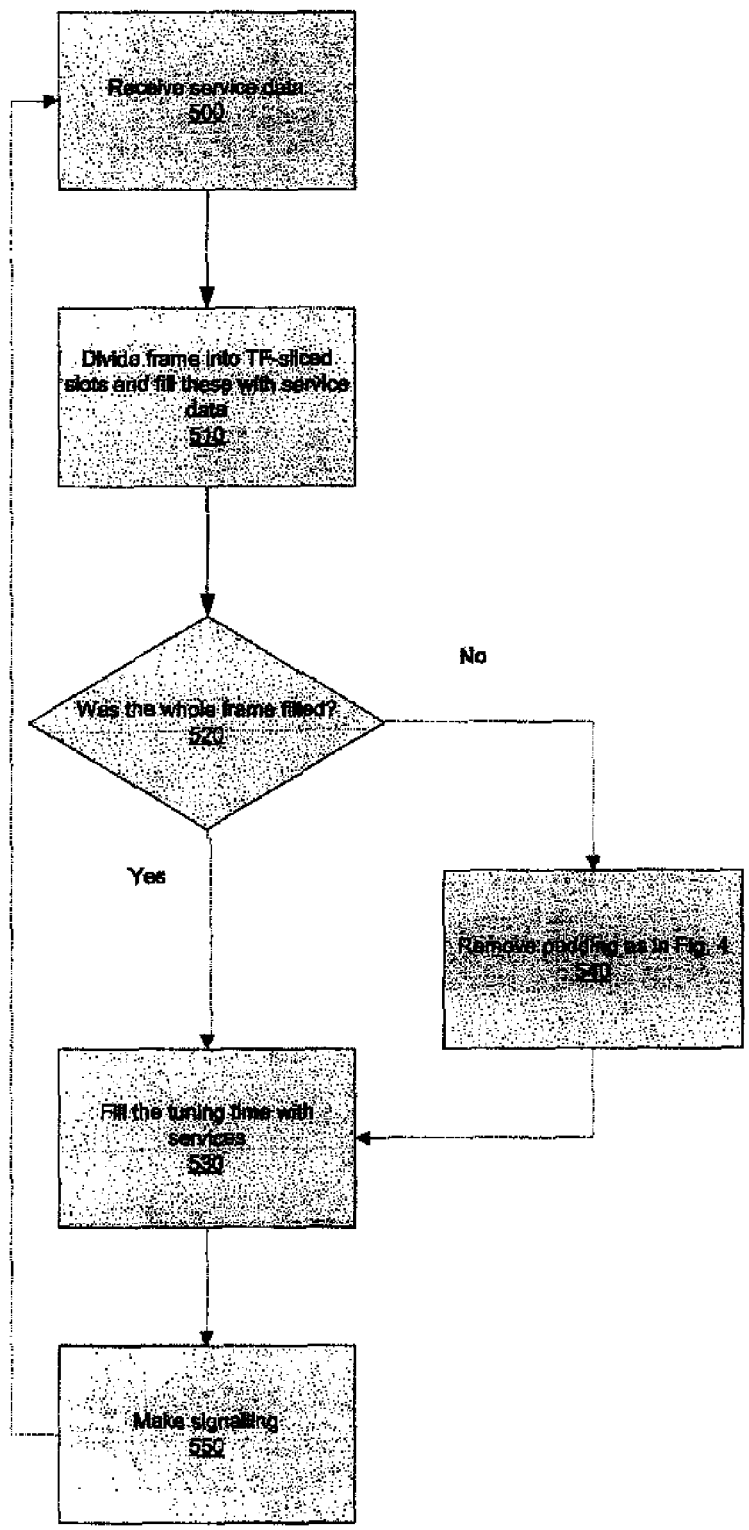
FIG. 5 is a flow chart illustrating scheduler procedures for the removal of padding in TF frames in accordance with various embodiments of the present invention.

It should be noted that either alternative results in the removal of padding, i.e., removal of the overhead/dummy symbols. FIG. 5 illustrates various operations involved in such a padding removal process. It should be noted that more or less operations can be performed to effectuate such a feature. At 500, service data is received. At 510, the TF frame is divided into TF-sliced slots and these TF-sliced slots are filled with service data. It is determined whether the entire TF frame was filled at 520. If the entire TF frame was filled, the tuning time slot is filled with services at 530. If the entire TF frame was not filled at 540, padding is removed as described above, and as shown in FIG. 4. After the tuning time slot is filled or padding is removed therefrom, signaling is made at 550.

Figure 6:
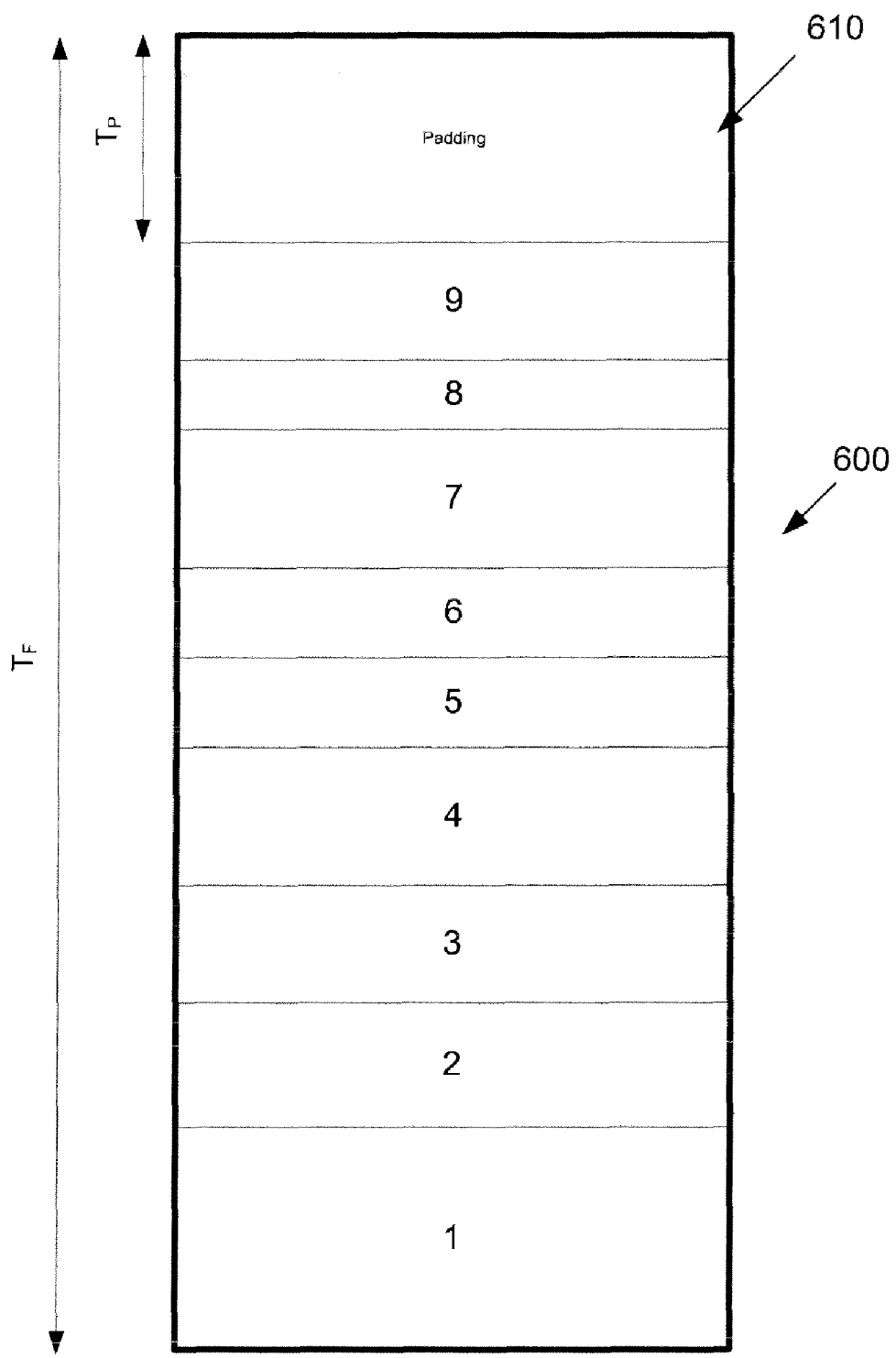
FIG. 6 illustrates a TF frame divided into service slots of differing size in accordance with one embodiment of the present invention.

Yet another alternative includes handling slots that exceed the border for cyclic transfer by adding a guard period when the slots in the TF frames allocated to different services are of different sizes. FIG. 6 illustrates a TF frame 600 that is divided into slots, one for each service. The size of the slot can be determined by the bit rate of the service. Therefore, the slot size may change from frame to frame in accordance with the bit rate variation, although the frame size itself is fixed. In the event that there is not enough service data to fill the entire frame, the remaining portion of the frame is filled with padding bits 610.

Figure 7:
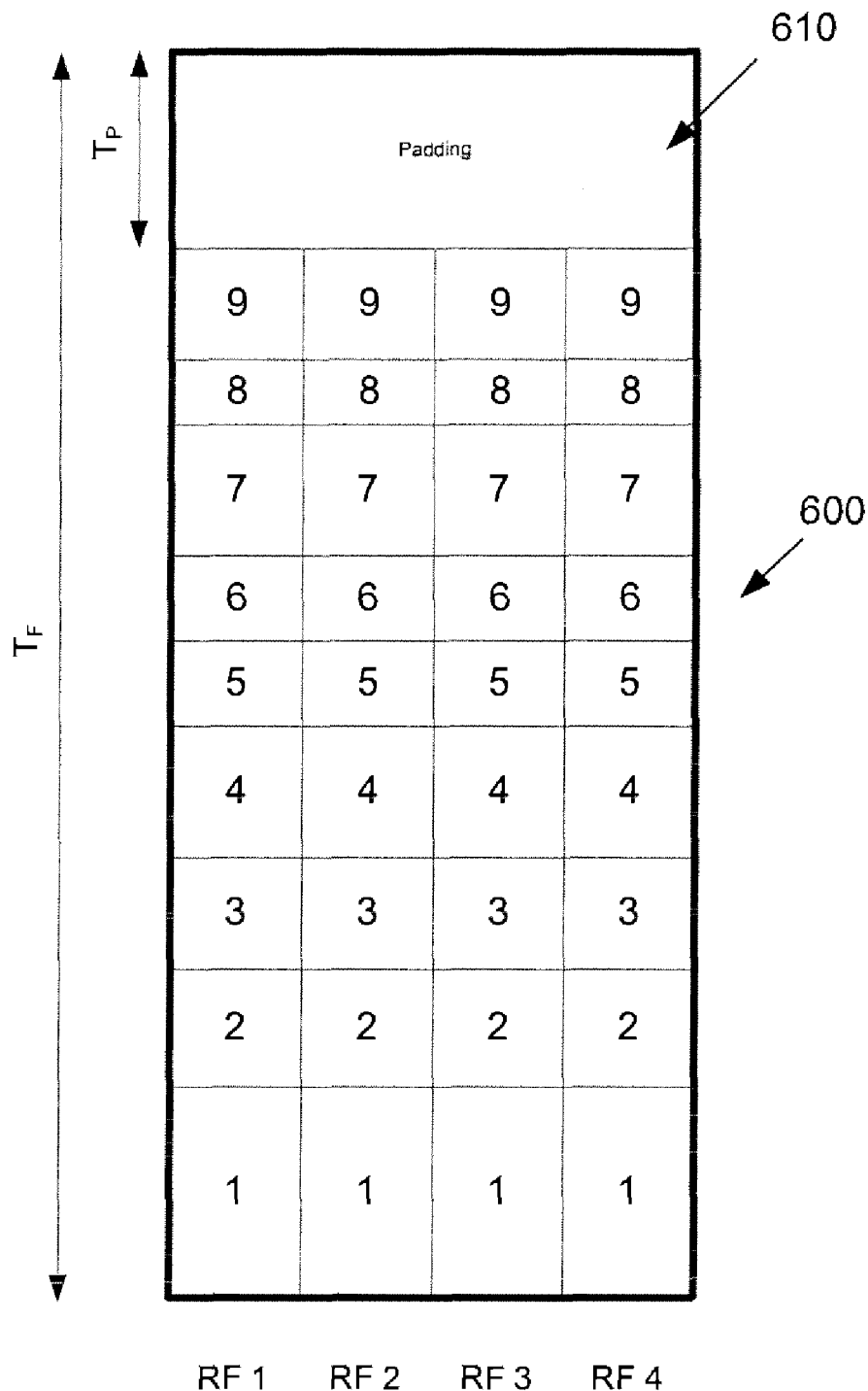
FIG. 7 illustrates equally divided slots for each RF channel of a TF frame in accordance with the embodiment of FIG. 6.
Figure 8:
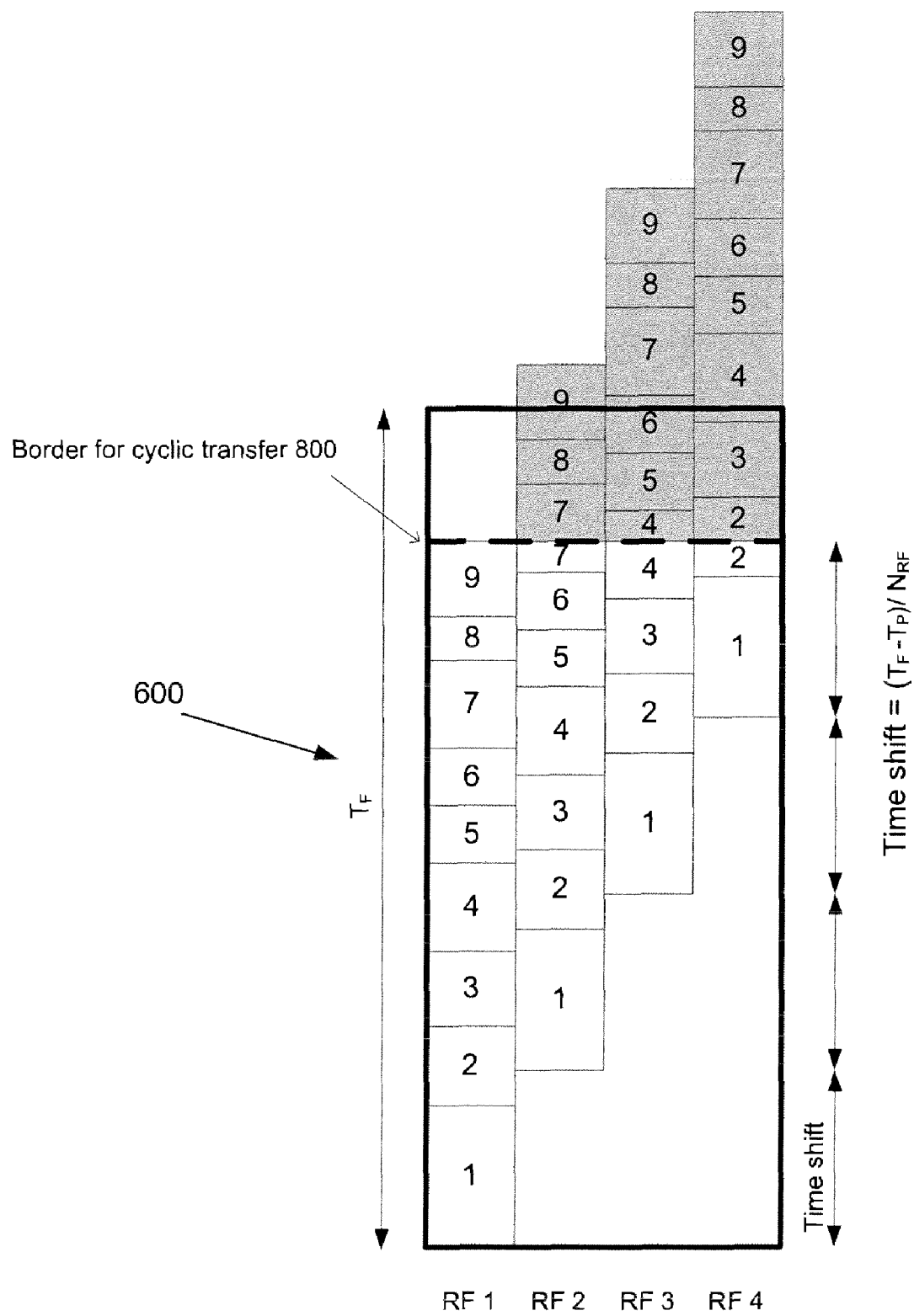
FIG. 8 illustrates time shifting between RF channels in accordance with the embodiment of FIG. 6.
Figure 9:
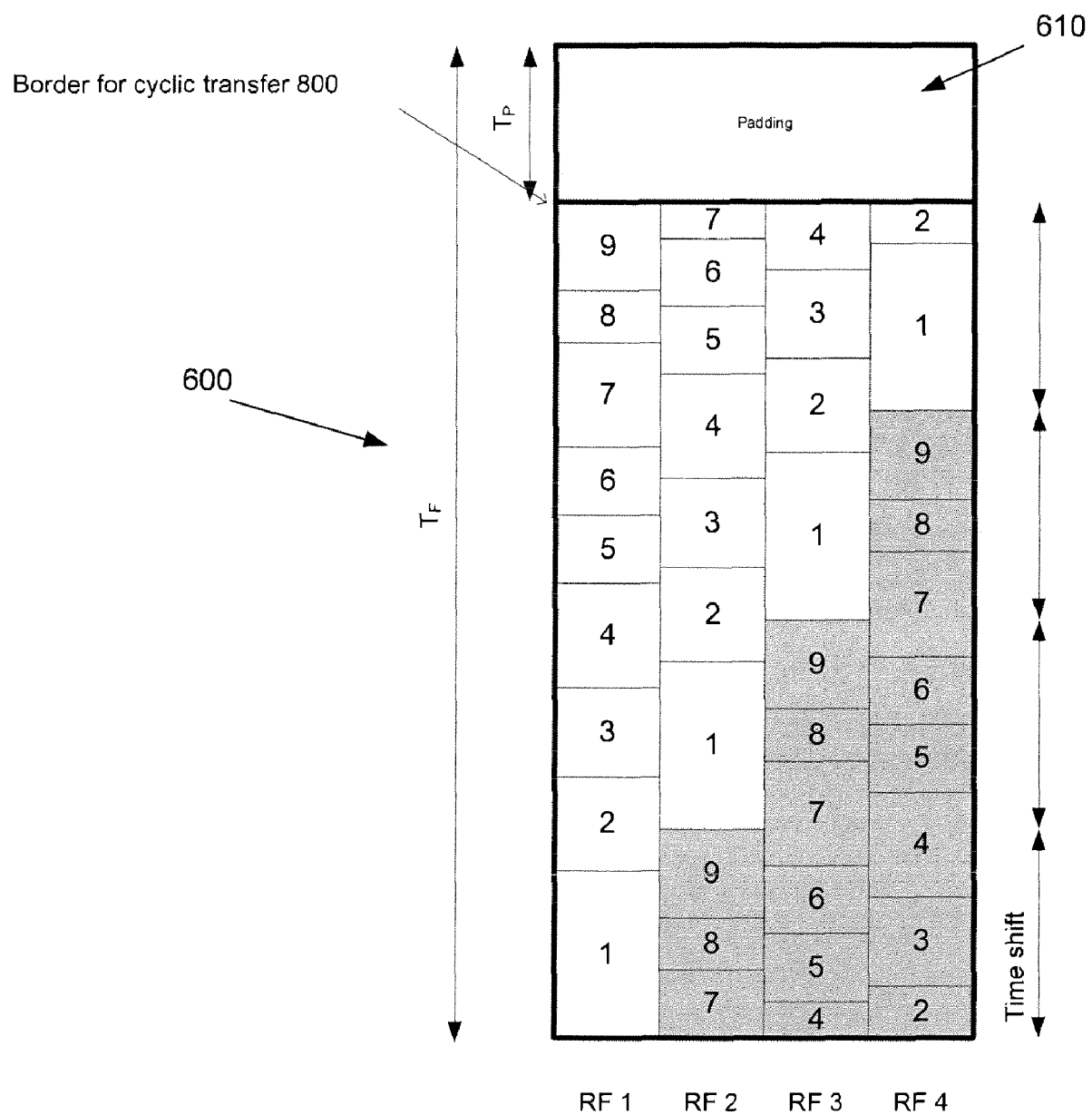
FIG. 9 illustrates cyclical shifting of slots and/or slot fragments in accordance with the embodiment of FIG. 6.
Figure 10:
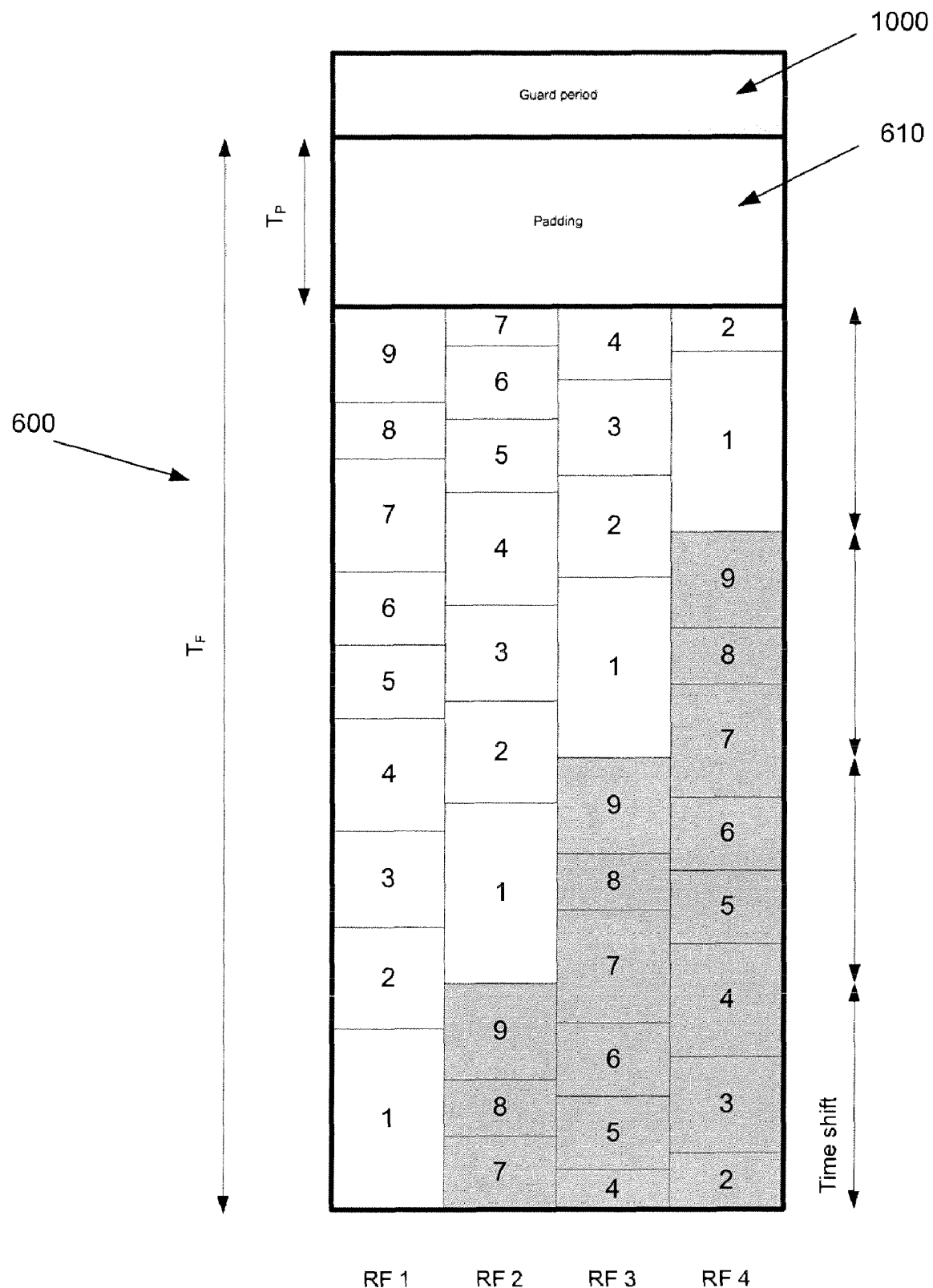
FIG. 10 illustrates the addition of a guard period after padding is added in accordance with the embodiment of FIG. 6.

FIG. 7 illustrates that equal division of slots across each of the RF channels R1, R2, R3, and R4 in the TF frame 600. FIG. 8 illustrates the time shifting which is performed between the RF channels, where the time shift is determined by the frame duration $T_F$, padding duration $T_P$, and the number of RF channels $N_{RF}$. In this case, slots 7-9 of RF2, slots 4-9 of RF3, and slots 2-9 of RF 4 exceed the border for cyclic transfer 800. It should be noted that the added padding 610 is not included in the time shifting operation(s). As shown in FIG. 9, those slots or slot fragments that exceed the border for the cyclic transfer 800 are cyclically shifted to the beginning of the TF frame 600. The added padding 610 remains at the end of the TF frame 600. FIG. 10 illustrates the addition of a guard period 1000 to TF frame 600 after the added padding 610.

According to another embodiment, a service can be transmitted in every second or $n^{th}$ TF frame. It can be assumed that 20 services (although more or less services are possible) are to be transmitted and that the total (summed) capacity of services 1-10 and services 11-20 are approximately equal. If services 1-10 are transmitted in every odd TF frame (e.g., TF frames 1, 3, 5, etc.), time for tuning and data processing exists in every even TF frame (e.g., TF frames 2, 4, 6, etc.) Therefore, services 11-20 can be transmitted in the even TF frames and have time for tuning and data processing in every odd TF frame. It should be noted that transmission of the services in every second TF frame can be carried out in at least two ways. That is, either the TF frame is the same size as if transmitting the services in every TF frame, or the TF frame length is halved.

Yet another advantage to transmitting a service in every second TF frame, except for simplifying scheduling, is more robust signaling (i.e., P1 & P2). This is because no overhead is produced, as when compared to the case of transmitting a service in every TF frame, if the TF frame size is kept the same.

Figure 11:
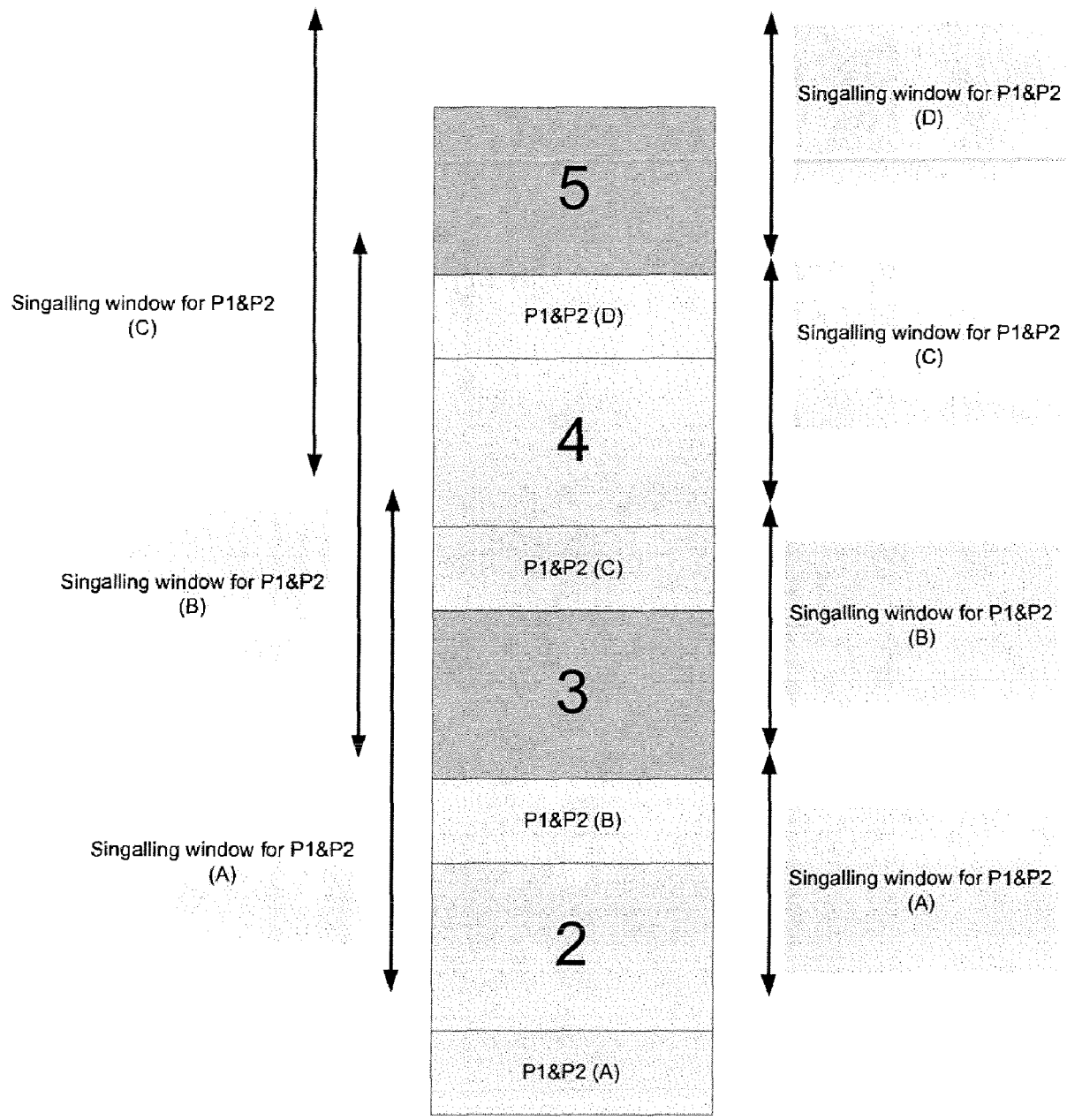
FIG. 11 is a representation of TF frames illustrating a comparison between prior art signaling windows and signaling windows as utilized in accordance with various embodiments of the present invention.

In a scenario where all 20 services are transmitted in every TF frame, the dynamic layer 1 signaling contains the starts and lengths of every slot. In other words, 20 fields exist all together for starts and 20 fields exist for lengths. The signaling windows for this procedure are shown by arrows to the right in FIG. 11. The signaling windows are conventionally used to allow the receiver to process the signaling information and if necessary, tune to another RF before starting reception of the next part of the service data.

Assuming that services 1-10 are transmitted in the odd TF frames, the dynamic layer 1 signaling instead can cover two TF frames, even though the amount of signaling data would still be 20 starts and 20 lengths. Therefore, the slot allocation for every TF frame is signaled twice. Ignoring the signaling offsets for simplicity's sake and assuming that one P2 slot carried the signaling for one TF frame, P1 & P2 (B) carries the signaling for TF frames 3 and 4. P1 & P2 (C) carries the signaling for TF frames 4 and 5 as illustrated with the arrows to the left in FIG. 11.

As described above, the capacity of the tuning time symbols in accordance with one embodiment is not redundant. For example, it could be filled with one or a combination of the following: auxiliary services, e.g., teletext, as illustrated in FIG. 12; for DVB-T2M, low bit rate services for handheld reception; radio services; file carousels; software updates; authority channels (Emergency Alert); guard period, P1, where if the P1 symbol is to be very short (2K) more robustness could be provided by repeating the symbol or using a longer P1 symbol (e.g., 8K); and signaling.

Figure 14:
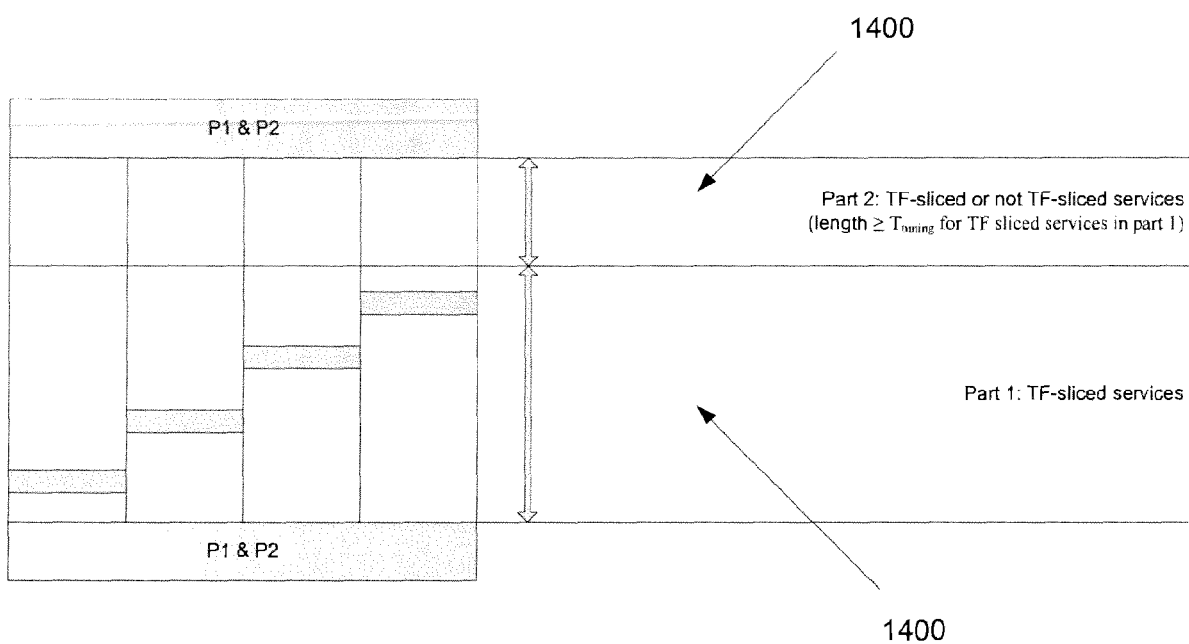
FIG. 14 illustrates the allocation of various parts of TF-sliced and/or non-TF-sliced services in accordance with various embodiments of the present invention.

Furthermore, if required, the time allocated for the above-mentioned services can be greater than the tuning time for the ordinary TF-sliced services. In other words, the slot allocations for one service can be one or several slots per TF frame, either TF sliced or non TF sliced as illustrated in FIG. 14, described in greater detail below.

Figure 12:
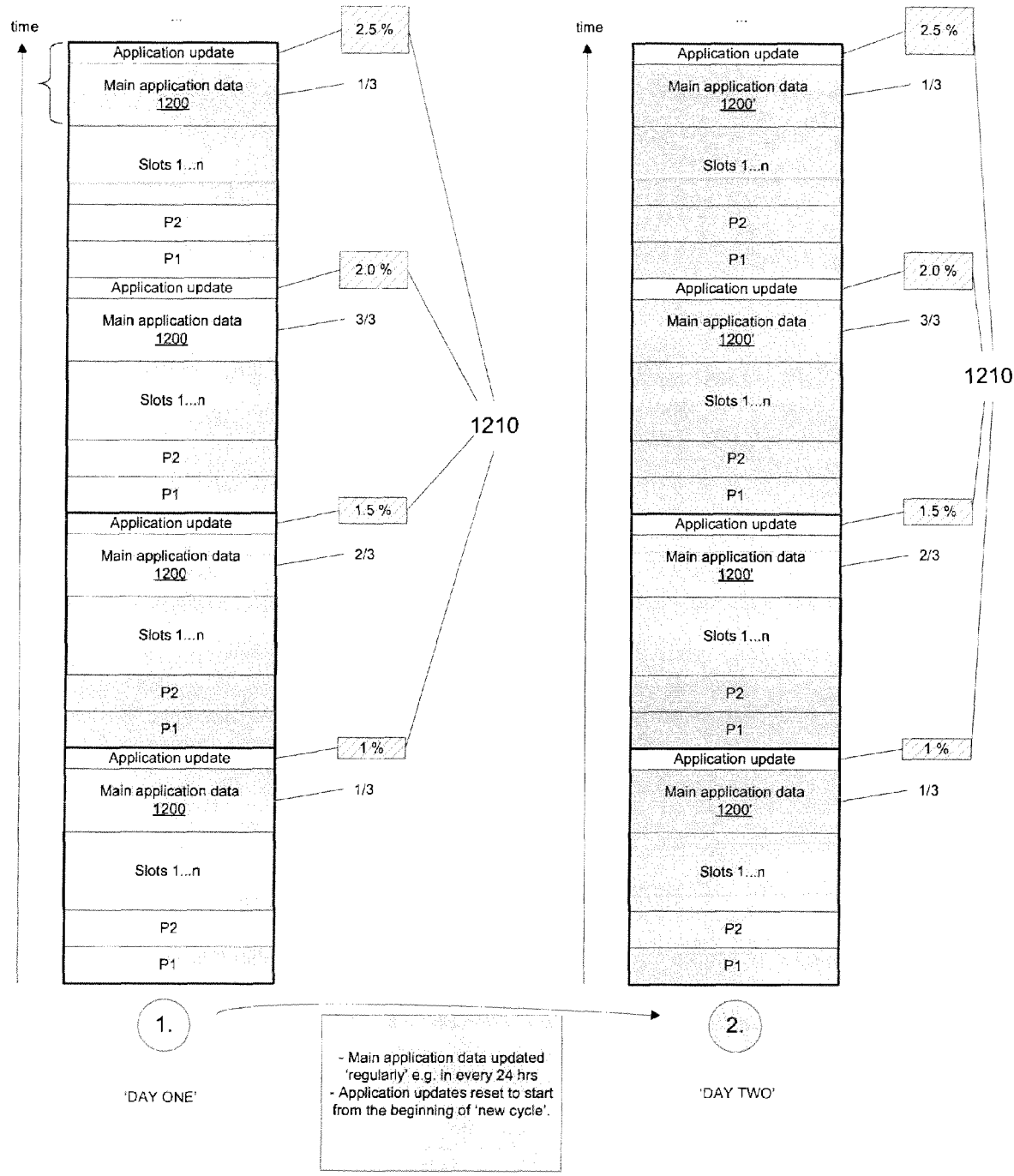
FIG. 12 illustrates an implementation of transmitting teletext service and updates within a tuning time and low bitrate application slot in accordance with one embodiment of the present invention.

FIG. 12 illustrates an implementation of an embodiment utilizing the transmission and update of a teletext service as an example. In this embodiment, the "main application data" 1200 in "DAY ONE" represents a "teletext application" without updates that will occur over time. The main application data 1200' shown at the beginning of "DAY TWO" is the main application data 1200 of the DAY ONE in addition to all of the updates that have been processed during the DAY ONE, i.e., the "latest version" of the teletext that is used as a starting point for the constantly occurring updates during DAY TWO. As depicted in FIG. 12, the main application data 1200 and 1200' can be transmitted in several chunks and then "carouselled" over time.

Application updates in turn, are transmitted in a chunk that is increasing in size over time, i.e., each application update contains all of the updated information since the beginning of the "DAY." FIG. 12 indicates these percentage increases 1210 of the application update. Ultimately the merger of the updates of DAY ONE summed into the main application data 1200 of DAY ONE will be used as a basis for the main application data 1200' in DAY TWO. In addition, the expired information can always be reduced from the main application data 700'.

The tuning time can be estimated to be approximately 5 ms (although different times can be utilized in accordance with various embodiments), which corresponds to approximately 5 OFDM symbols with Fast Fourier Transform (FFT) size of 8K and a guard interval of ⅛. One OFDM symbol duration including guard interval can be $$\left(1 + \frac{1}{8}\right) * 896 \ \mu s = 1 \ ms,$$

where symbol duration=896 μs for 8K. Therefore, a TF frame of length 200 ms results in 2.5% of the capacity. In an 8K system with 6048 data carriers per OFDM symbol (as in DVB-T) and a TF frame length of 200 ms, for example, a capacity of approximately 600 kb/s is provided on each RF with modulation and code rates of 256-QAM ½ or 64-QAM ⅔. This results, for example, in the enabling of transportation for up to four 150 kb/s radio channels per RF channel.

Figure 13:
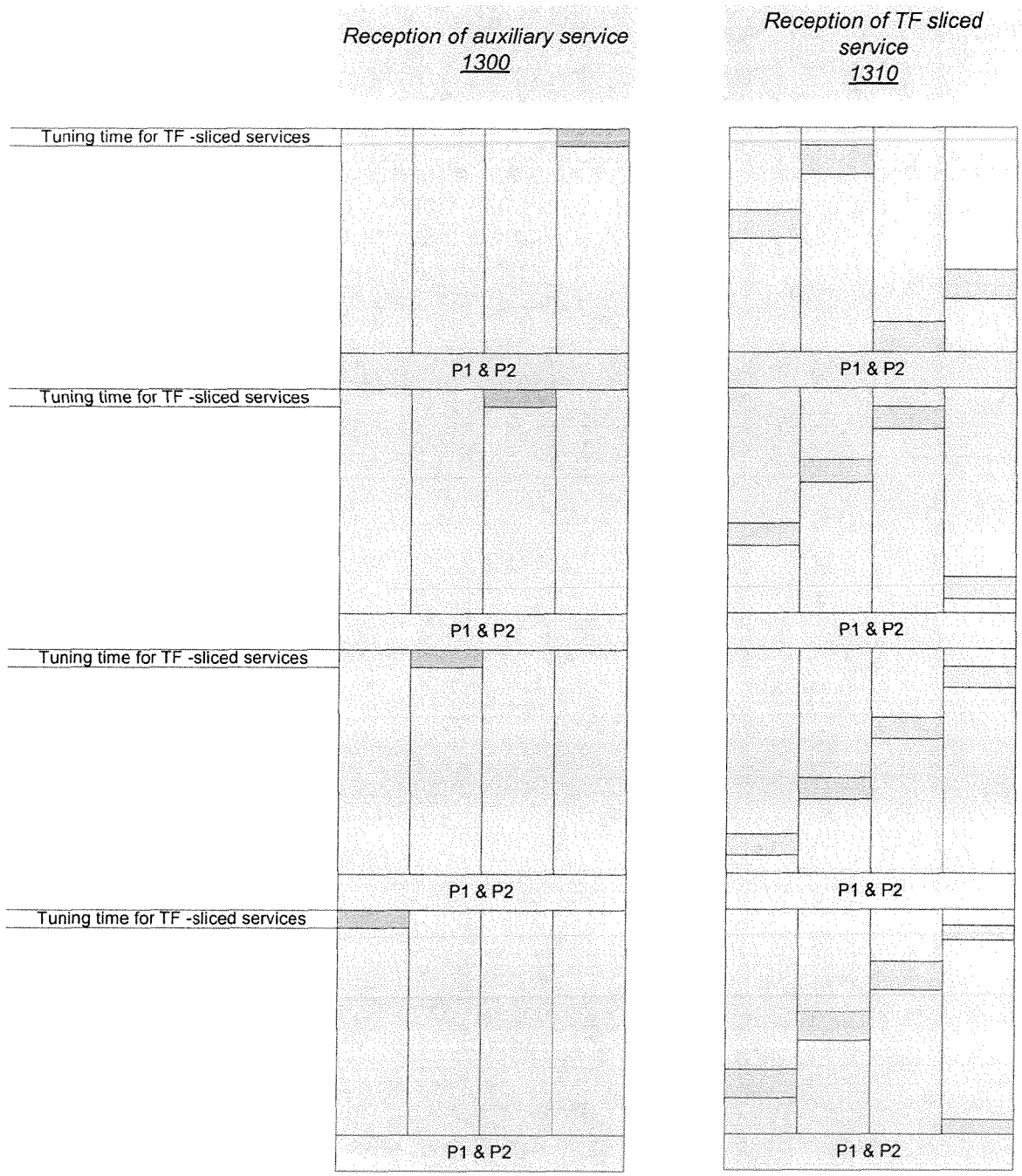
FIG. 13 illustrates the utilization of slot allocations for an auxiliary service located in the tuning time for TF-sliced services (to the left) and a conventional TF-sliced service (to the right) in accordance with one embodiment of the present invention.

FIG. 13 illustrates slot allocations for auxiliary service 1300 and TF-sliced service 1310 according to an embodiment. The auxiliary service 1300 to the left can also be allocated slots on the same RF to enable reception with a non-hopping tuner. The service can thus be encoded, protected, and interleaved over several slots, e.g., over data transmitted in several TF frames.

In accordance with yet another embodiment, FIG. 14 demonstrates that allocations for the auxiliary (or other) services allocated slots during the tuning time can be allocated even over a larger part of the TF frame than just the tuning time for the TF sliced services. In other words, it is possible to provide significant flexibility to the system by allowing part 2 (shown as 1400 in FIG. 14) to be of a length$\geq T_{tuning}$. It is also possible to allocate services to only one RF channel and enable reception with a non-hopping tuner (such as with DVB-T). Moreover, it is possible to provide TF-sliced services during part 2. It should be noted that the location of part 1 (shown as 1410 in FIG. 14) and part 2 in the TF frame is not fixed. As a result, the TF frames can consist of three types of components: part 1, e.g., TF-sliced services; part 2, e.g., non TF-sliced services possibly in combination with TF-sliced services; and P1 & P2 signaling. These three parts can be located in any way relative to each other.

Furthermore, the services in part 2 do not have to be low-bit rate services, but can be any kind of service. It is also possible to have two different parts for TF sliced services in accordance with various embodiments, which results in a situation, where two different parts of the TF frame carry different TF sliced services without signaling between them e.g., P1 & P2+part 1+part 1; P1 & P2+ . . . .

It should be noted that allocating non TF-sliced services requires more dynamic L1 signaling. That is, the border between part 1 and part 2 in FIG. 14 should be signaled. Moreover, if allocating services carried in part 2 is performed in a dynamic manner, additional signaling is also required.

With regard to various embodiments, where tuning time is added before or after the P1 & P2 signaling symbols, sufficient time for tuning can generally always be provided when receiving TF sliced services. Additionally, simple scheduling can be effectuated and no restrictions for bit rate variations of the services are necessarily required. Furthermore, the transmission of non TF-sliced services on one or several RFs is enabled, as is the dynamic removal of padding or every TF frame.

As to various embodiments, where a service is transmitted in every second/other TF frame, sufficient time for tuning is also generally ensured when receiving TF sliced services. Again, simple scheduling can be effectuated with such embodiments, while overhead is not incurred, and the robustness of P1 & P2 (if TF frame length is unchanged) can be increased.

Figure 15:
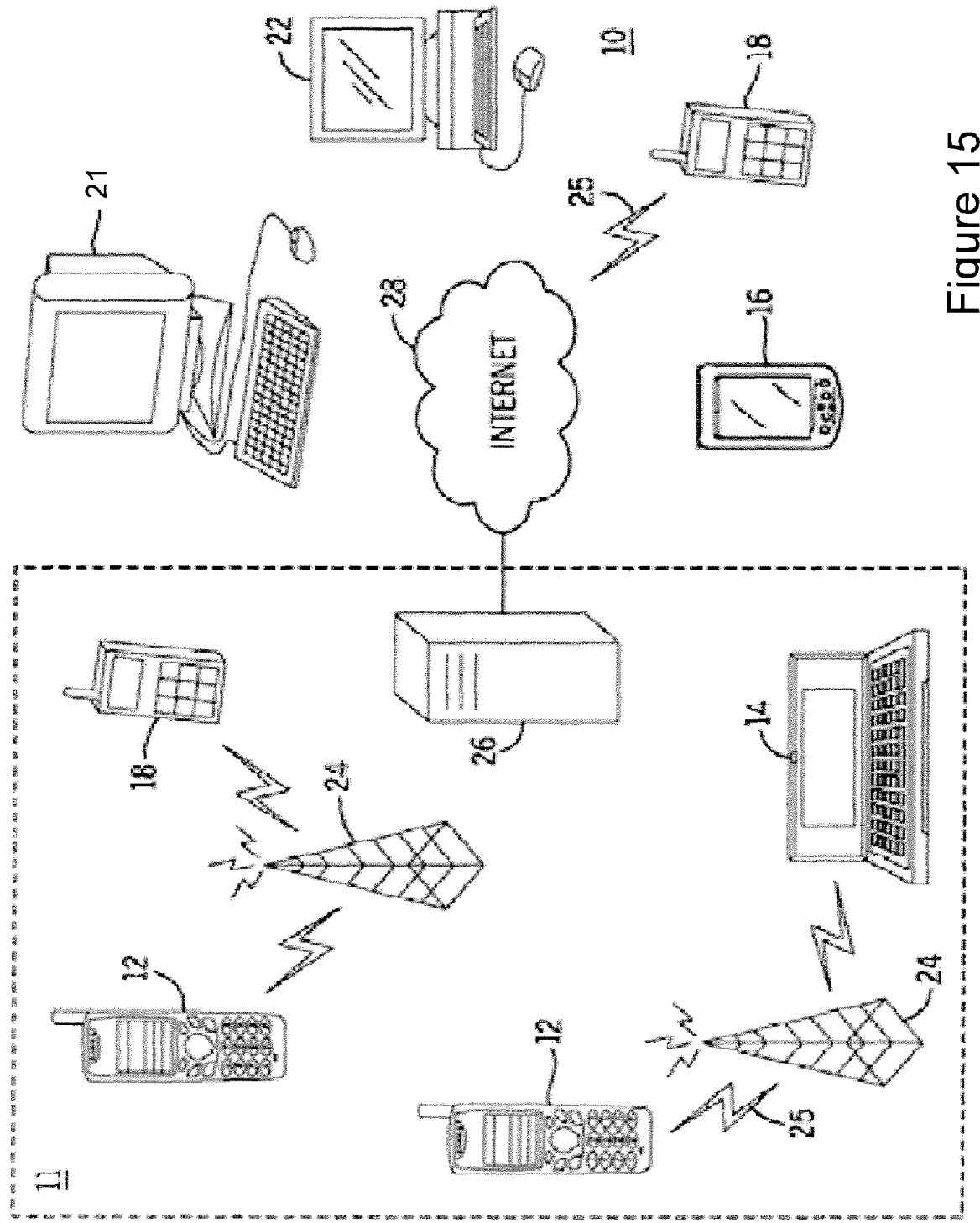
FIG. 15 is an overview diagram of a system within which various embodiments of the present invention may be implemented.

For exemplification, the system 10 shown in FIG. 15 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like. The exemplary communication devices of the system 10 may include, but are not limited to, a mobile device 12, a combination PDA and mobile telephone 14, a PDA 16, an integrated messaging device (IMD) 18, a desktop computer 21, and a notebook computer 22. Such devices can be utilize OBEX to exchange binary data as described above. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 16:
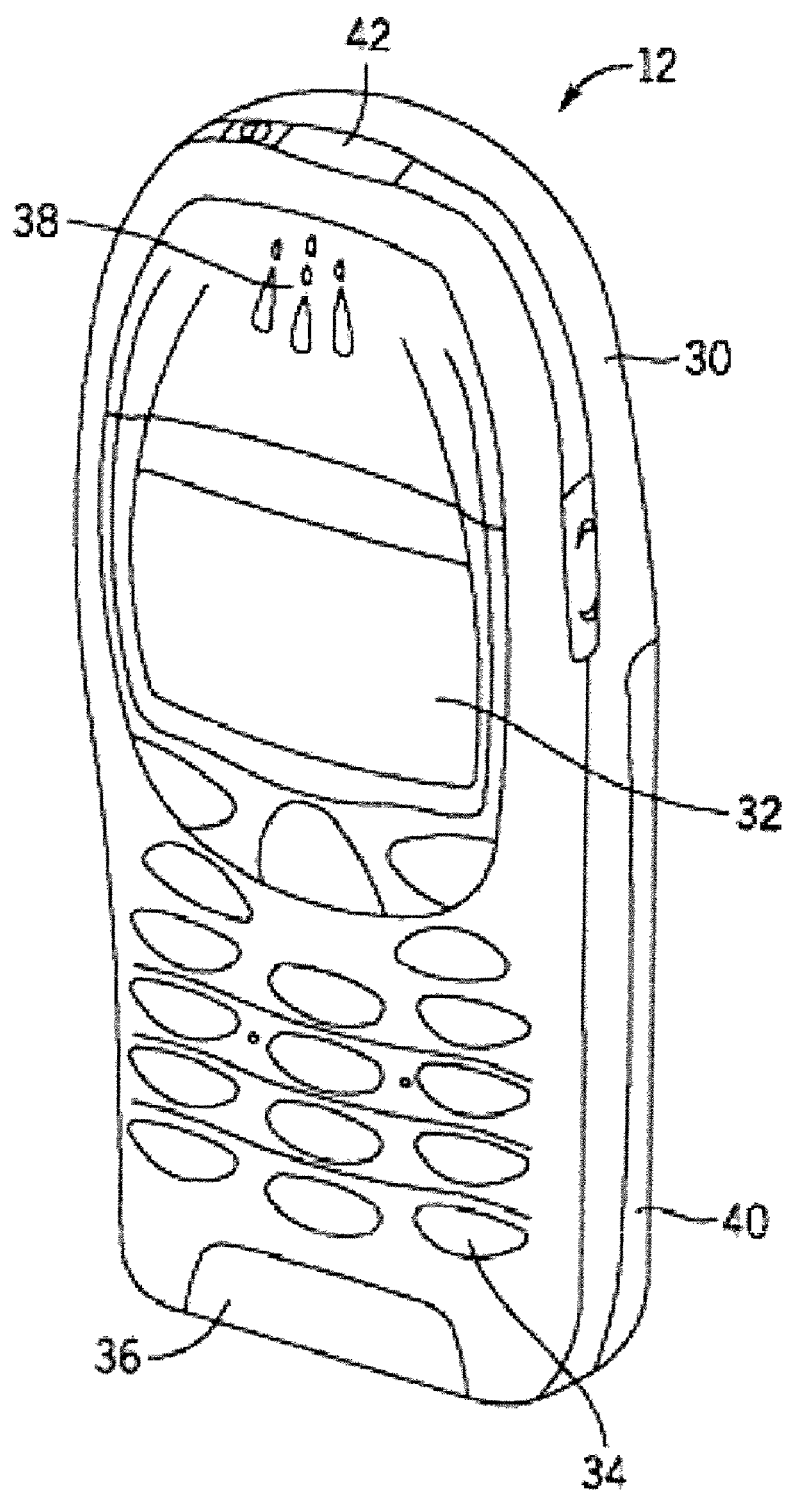
FIG. 16 is a perspective view of an electronic device that can be used in conjunction with the implementation of various embodiments of the present invention.
Figure 17:
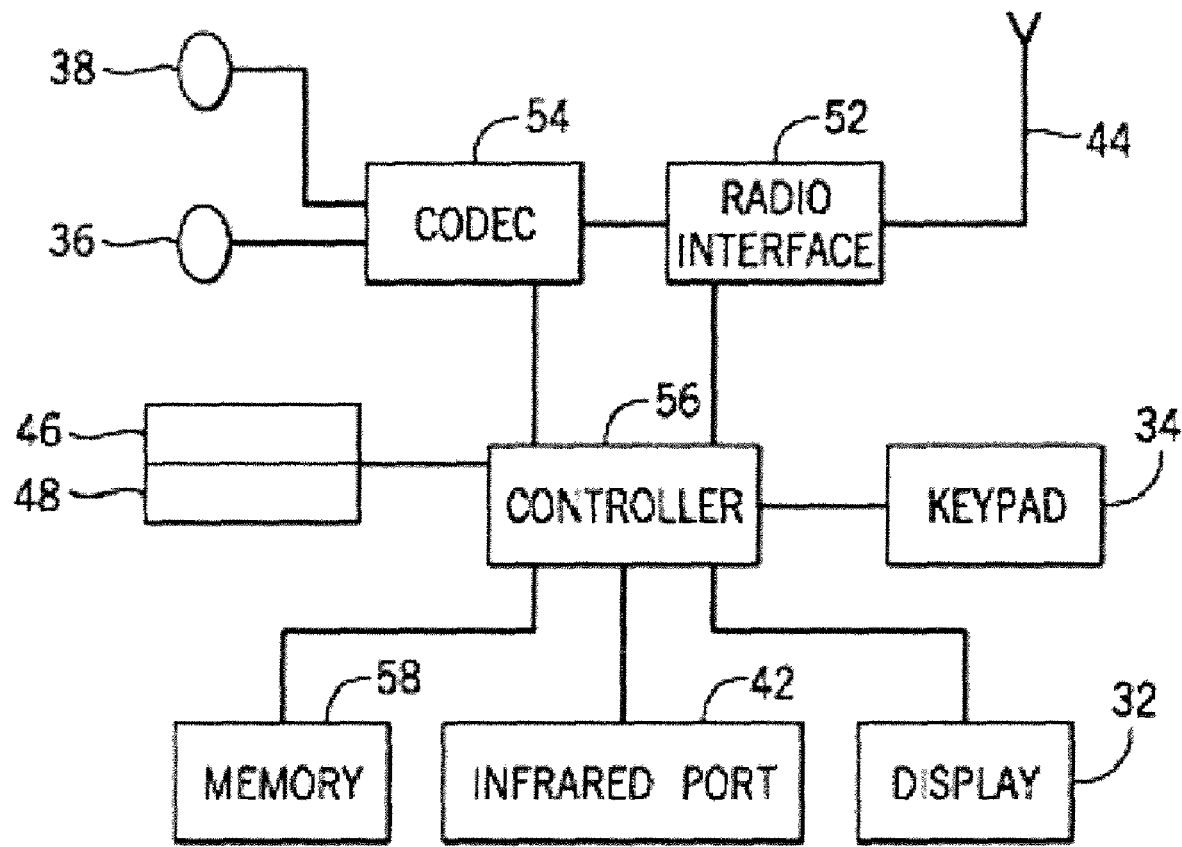
FIG. 17 is a schematic representation of the circuitry which may be included in the electronic device of FIG. 11.

FIGS. 16 and 1217 show one representative mobile device 12 within which the present invention may be implemented. It should be understood, however, that the present invention is not intended to be limited to one particular type of electronic device. The mobile device 12 of FIGS. 16 and 17 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:
   dividing n number of time frequency frames into a plurality of slots, each of the time frequency frames having one or more radio-frequency channels; and
   providing time for tuning to another radio-frequency channel between at least two of the time frequency frames by one of adding a time period corresponding to a length of the time for tuning before a pilot signaling symbol, adding the time period corresponding to the length of the time for tuning after the pilot signaling symbol, and transmitting a service in every $n^{th}$ time frequency frame while providing the time for tuning in every $n^{th}+1$ time frequency frame.

2. The method of claim 1, wherein if the time period corresponding to the length of the time for tuning is added before the pilot signaling symbol, the pilot signaling symbol is utilized for at least one of synchronization and channel estimation of a main service carried on the time frequency frames during the time for tuning.

3. The method of claim 2 further comprising, removing overhead created if the service produces data that does not fill the time frequency frames' full capacity.

4. The method of claim 1, wherein if the time period corresponding to the length of the time for tuning is added after the pilot signaling symbol, the pilot signaling symbol is utilized for at least one of synchronization and channel estimation of an auxiliary service carried on the time frequency frames during the time period corresponding to the length of the time for tuning.

5. The method of claim 4 further comprising, removing overhead created if the service produces data that does not fill the time frequency frames' full capacity.

6. The method of claim 1, wherein the transmitting of the service every nth time frequency frame comprises halving lengths of the time frequency frames.

7. The method of claim 1 further comprising, performing cyclical time shifting of at least fragments of the plurality of slots that exceed a cyclic transfer border.

8. A non-transitory computer-readable medium including computer program code, that with at least one processor, is configured to cause an apparatus to:
   divide n number of time frequency frames into a plurality of slots, each of the time frequency frames having one or more radio-frequency channels; and
   provide time for tuning to another radio-frequency channel between at least two of the time frequency frames by one of adding a time period corresponding to a length of the time for tuning before a pilot signaling symbol, adding the time period corresponding to the length of the time for tuning after the pilot signaling symbol, and transmitting a service in every $n^{th}$ time frequency frame while providing the time for tuning in every $n^{th}+1$ time frequency frame.

9. An apparatus, comprising:
   a processor; and
   a memory unit communicatively connected to the processor and including:
      computer code for dividing a number of time frequency frames into a plurality of slots, each of the time frequency frames having one or more radio-frequency channels; and
      computer code for providing a time period corresponding to the length of the time for tuning to another radio-frequency channel between at least two of the time frequency frames by one of adding a time period corresponding to a length of the time for tuning before a pilot signaling symbol, adding the time period corresponding to the length of the time for tuning after the pilot signaling symbol, and transmitting a service in every $n^{th}$ time frequency frame while providing the time for tuning in every $n^{th}+1$ time frequency frame.

10. The apparatus of claim 9, wherein if the time period corresponding to the length of the time for tuning is added before the pilot signaling symbol, the pilot signaling symbol is utilized for at least one of synchronization and channel estimation of a main service carried on the time frequency frames during the time for tuning.

11. The apparatus of claim 10, wherein the memory unit further comprises computer code for removing overhead created if the service produces data that does not fill the time frequency frames' full capacity.

12. The apparatus of claim 9, wherein if the time period corresponding to the length of the time for tuning is added after the pilot signaling symbol, the pilot signaling symbol is utilized for at least one of synchronization and channel estimation of an auxiliary service carried on the time frequency frames during the time for tuning.

13. The apparatus of claim 12, wherein the memory unit further comprises computer code for removing overhead created if the service produces data that does not fill the time frequency frames' full capacity.

14. The apparatus of claim 9, wherein the transmitting of the service every nth time frequency frame comprises halving lengths of the time frequency frames.

15. The apparatus of claim 9, wherein the memory unit further comprises computer code for performing cyclical time shifting of at least fragments of the plurality of slots that exceed a cyclic transfer border.

* * * * *